(12) United States Patent
Goleski et al.

(10) Patent No.: US 9,371,000 B2
(45) Date of Patent: Jun. 21, 2016

(54) TRANSMISSION HAVING INTEGRATED TRANSMISSION PUMP AND ACCESSORY DRIVE

(71) Applicant: Ford Global Technologies, LLC, Dearborn, MI (US)

(72) Inventors: Gregory Daniel Goleski, Rochester Hills, MI (US); Jeffrey Edward Maurer, Commerce, MI (US); Laurence Andrew Deutsch, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/575,140

(22) Filed: Dec. 18, 2014

(65) Prior Publication Data
US 2015/0283899 A1 Oct. 8, 2015

Related U.S. Application Data

(60) Provisional application No. 61/976,236, filed on Apr. 7, 2014.

(51) Int. Cl.
*B60K 17/28* (2006.01)
*F16H 47/08* (2006.01)
*F16H 57/02* (2012.01)

(52) U.S. Cl.
CPC .............. *B60K 17/28* (2013.01); *F16H 47/08* (2013.01); *F16H 2057/02026* (2013.01)

(58) Field of Classification Search
CPC .. B60K 17/28; B60K 25/06; B60K 2025/065; F16H 2700/02; F16H 37/00; F16H 47/08; F16H 2057/02026
See application file for complete search history.

(56) References Cited

U.S. PATENT DOCUMENTS

| | | | | | |
|---|---|---|---|---|---|
| 3,698,265 | A | * | 10/1972 | Williams | F16H 37/00 418/199 |
| 4,119,169 | A | * | 10/1978 | Hopkins | B60K 17/10 180/307 |
| 4,454,786 | A | * | 6/1984 | Stockton | F16H 47/085 192/48.61 |
| 4,794,807 | A | * | 1/1989 | Horii | B60K 17/28 74/15.66 |

(Continued)

FOREIGN PATENT DOCUMENTS

DE 19750497 A1 1/1999

OTHER PUBLICATIONS

Turkish International Search Report dated Nov. 6, 2015 in the corresponding Turkish Application No. 2015/04090 filed Apr. 3, 2015, pp. 1-6.

*Primary Examiner* — Laura Freedman
(74) *Attorney, Agent, or Firm* — James Dottavio; Brooks Kushman P.C.

(57) ABSTRACT

A transmission includes provisions to mount two accessory drive units and to transmit power to the accessory drive units from an engine. The accessories are driven by an accessory drive gear that is coupled to a torque converter impeller as opposed to a turbine such that power is provided to the accessories regardless of the selected gear state or vehicle speed. The accessory drive gear also transmits power to an off-axis transmission pump. In one embodiment, power is transferred to the accessories via idler gears that is supported by the transmission housing and is present even when no accessory is installed. In another embodiment, the idler gear is supported by the accessory drive unit and is only present when the accessory is installed.

13 Claims, 5 Drawing Sheets

(56) References Cited

U.S. PATENT DOCUMENTS

| | | | | |
|---|---|---|---|---|
| 4,824,128 A | * | 4/1989 | Takagi | B60K 17/02 180/365 |
| 5,211,064 A | * | 5/1993 | Betz | B60K 25/06 74/15.66 |
| 5,263,377 A | | 11/1993 | Kieber | |
| 5,557,980 A | * | 9/1996 | Mastroianni | B60K 17/28 192/54.3 |
| 5,669,842 A | * | 9/1997 | Schmidt | B60K 6/365 180/65.25 |
| 5,761,959 A | * | 6/1998 | Winter | B60K 17/28 74/15.66 |
| 5,826,460 A | * | 10/1998 | Soncina | B60K 17/28 74/15.88 |
| 5,931,757 A | * | 8/1999 | Schmidt | B60K 6/26 475/2 |
| 6,223,848 B1 | * | 5/2001 | Young | B60K 17/105 180/242 |
| 7,273,126 B2 | * | 9/2007 | Inoue | B60K 17/105 180/337 |
| 7,282,003 B2 | | 10/2007 | Klemen et al. | |
| 7,396,311 B2 | | 7/2008 | Ali et al. | |

* cited by examiner

TRANSMISSION HAVING INTEGRATED TRANSMISSION PUMP AND ACCESSORY DRIVE

CROSS-REFERENCE TO RELATED APPLICATIONS

This application claims the benefit of U.S. provisional application Ser. No. 61/976,236 filed Apr. 7, 2014, the disclosure of which is hereby incorporated in its entirety by reference herein.

TECHNICAL FIELD

This disclosure relates to the field of automatic transmissions for motor vehicles. More particularly, the disclosure relates to a transmission having an accessory drive.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Most transmission are equipped with a torque converter or other type of launch device. When the vehicle is stationary or moving very slowly, the gearbox input speed is less than the minimum operating speed of the engine. A launch device transmits torque from the engine to the gearbox input while permitting the engine to rotate at an acceptable speed. A torque converter includes an impeller driven by the engine and a turbine driving the gearbox input. Torque is transferred from the impeller to the turbine hydro-dynamically.

Some types of vehicles need substantial amounts of power to run accessories in addition to the power required to propel the vehicle. These vehicles may use one or more accessory drive units, which may be called power take-off units, mounted to the transmission to provide this accessory power. If the accessory drive is connected to the turbine, then it only rotates when the vehicle is moving. Although this is acceptable for some types of accessories, other types of accessories require power when the vehicle is stationary.

SUMMARY OF THE DISCLOSURE

A transmission includes a transmission case, a primary drive gear fixed to an input shaft, and a first transmission pump drive gear meshing with the primary drive gear. The first transmission pump drive gear is configured to transmit power from the input shaft to a transmission pump, for example, via a second transmission pump gear and a pump shaft. The transmission case has provisions, such as bosses, to support a first accessory drive unit such that a first accessory drive gear meshes with the primary drive gear. The transmission case may include further provisions to support a second accessory drive unit such that a second accessory drive gear meshes with the primary drive gear. In some embodiments, the first and second accessory drive gears may be supported by the transmission when the accessory drive units are not present.

In some embodiments, a transmission includes a primary drive gear fixed to an input shaft, a pump drive gear meshing with the primary drive gear and configured to transmit power to a transmission pump, and a first idler gear meshing with the primary drive gear. The transmission may also include a second idler gear meshing with the primary drive gear. The pump drive gear, first idler gear, and second idler gear may be supported by a front support mounted to the transmission case. Alternatively, the first idler gear may be supported by a first accessory drive mounted to the transmission case. The transmission may also include a gear box having a plurality of hydraulically actuated shift elements configured to establish various speed ratios in response to fluid pressure supplied by the transmission pump.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
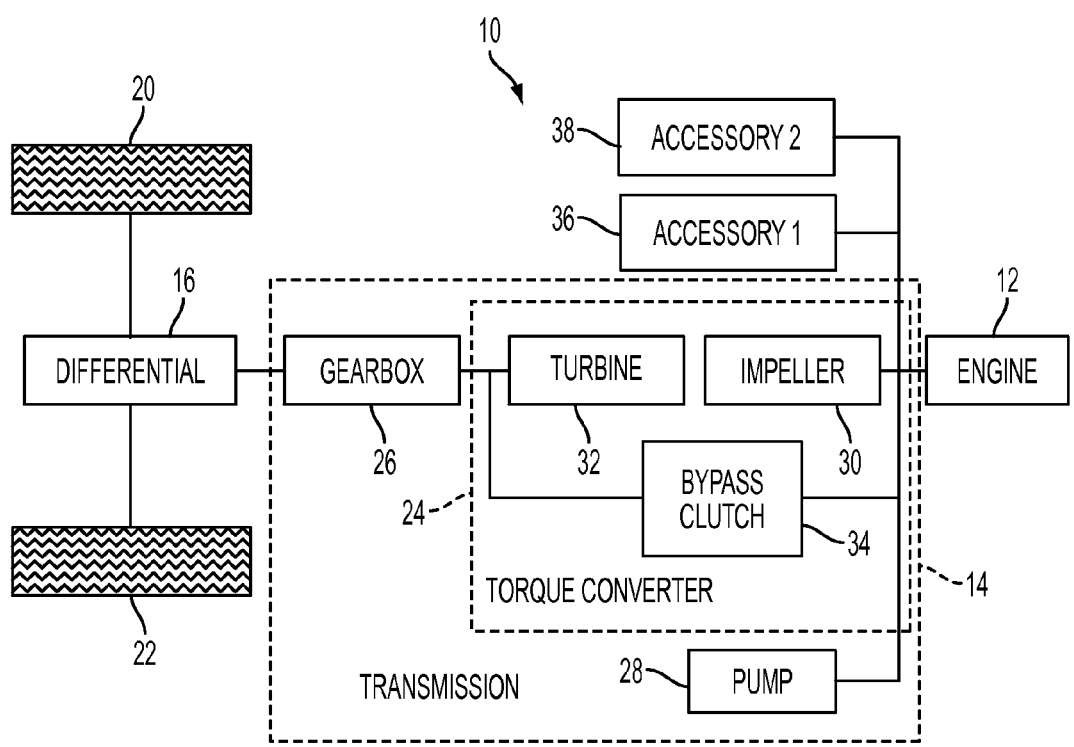
FIG. 1 is a schematic diagram of a vehicle powertrain with two accessory drives.

An exemplary vehicle powertrain 10 is illustrated schematically in FIG. 1. In FIG. 1, solid lines represent mechanical connections such as shafts or fixed ratio gearing. Engine 12 generates mechanical power by burning fuel. Transmission 14 transmits the power to differential 16 at a shaft speed suited to current vehicle needs, which may be faster or slower than the shaft speed at which engine 12 generates the power. Differential 16 reduces the shaft speed by a fixed final drive ratio and transmits the power to left and right driving wheels 20 and 22, allowing for slight speed differences between the wheels as the vehicle turns a corner.

Transmission 14 may include a torque converter 24 or other launch device and a gearbox 26. Torque converter 24 includes impeller 30 which is fixed to the engine crankshaft and turbine 32 which is fixed to the gearbox input shaft. Torque is transferred hydro-dynamically from impeller 30 to turbine 32 when impeller 30 rotates faster than turbine 32. Bypass clutch 34 may be engaged to transfer torque by friction from impeller 30 to turbine 32 to reduce the power loss inherent in the hydro-dynamic power transfer. Gearbox 26 includes a number of hydraulically actuated shift elements. Gearbox 26 establishes different speed ratios by engaging various subsets of the shift elements. Pressurized fluid to engage the shift elements is provided by transmission pump 28. Some of the power generated by engine 12 is used to drive transmission pump 28, reducing the power delivered to differential 16. In order to maximize the percentage of power delivered to differential 16 and thus reduce the amount of fuel consumed by engine 12, it is desirable to minimize the power consumption of transmission pump 28.

Accessories 36 and 38 are power consuming devices added by vehicle operators, typically after purchasing the vehicle. These accessories are mounted to the transmission structure using mounting provisions that may be provided by the transmission manufacturer. Accessories 36 and 38 are powered by the engine indirectly through the transmission. Some types of accessories require power only when the vehicle is moving, other types require power only when the vehicle is stationary, and yet other types require power in both circumstances.

For example, the vehicle engine can provide power for various tools at remote worksites by way of transmission mounted electric generators, hydraulic pumps, and air compressors. These accessories are only utilized when the truck is in park. A transmission mounted refrigeration compressor must work while the vehicle is travelling and while the vehicle is parked. When a truck is used for snow removal, a transmission mounted accessory may provide the power to raise and lower the snowplow. The driver would like to be able to raise and lower the plow while moving, while stopped with the vehicle in gear, and while in park.

Figure 2:
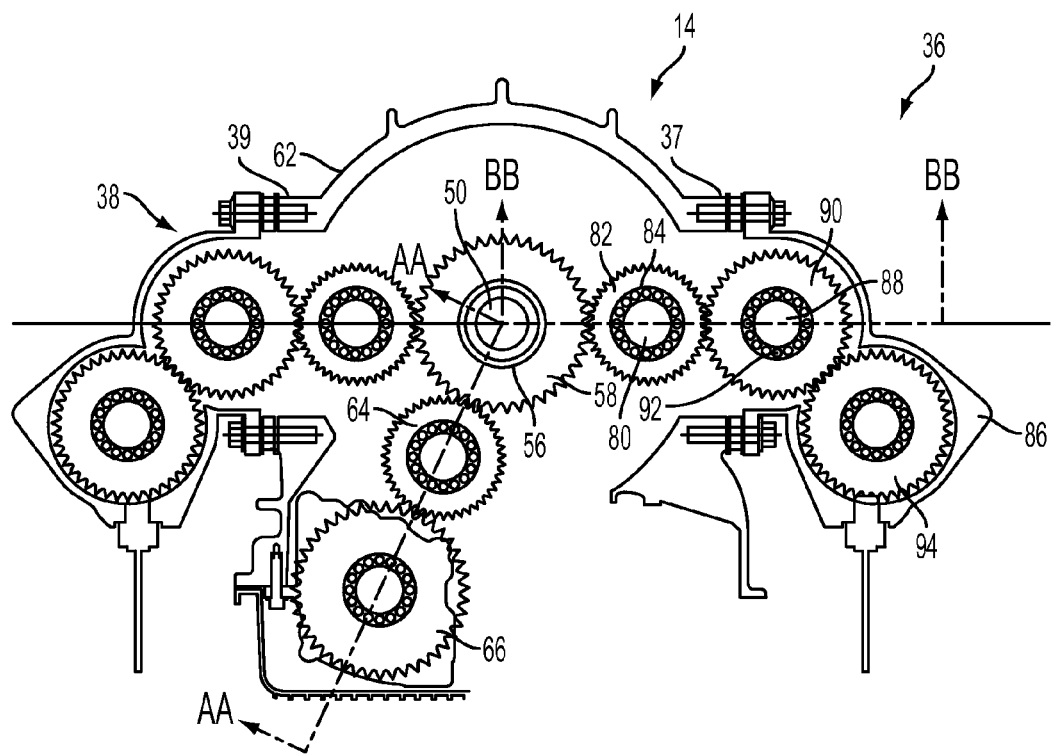
FIG. 2 is an end view cross section of the transmission and accessory drives of FIG. 1.
Figure 3:
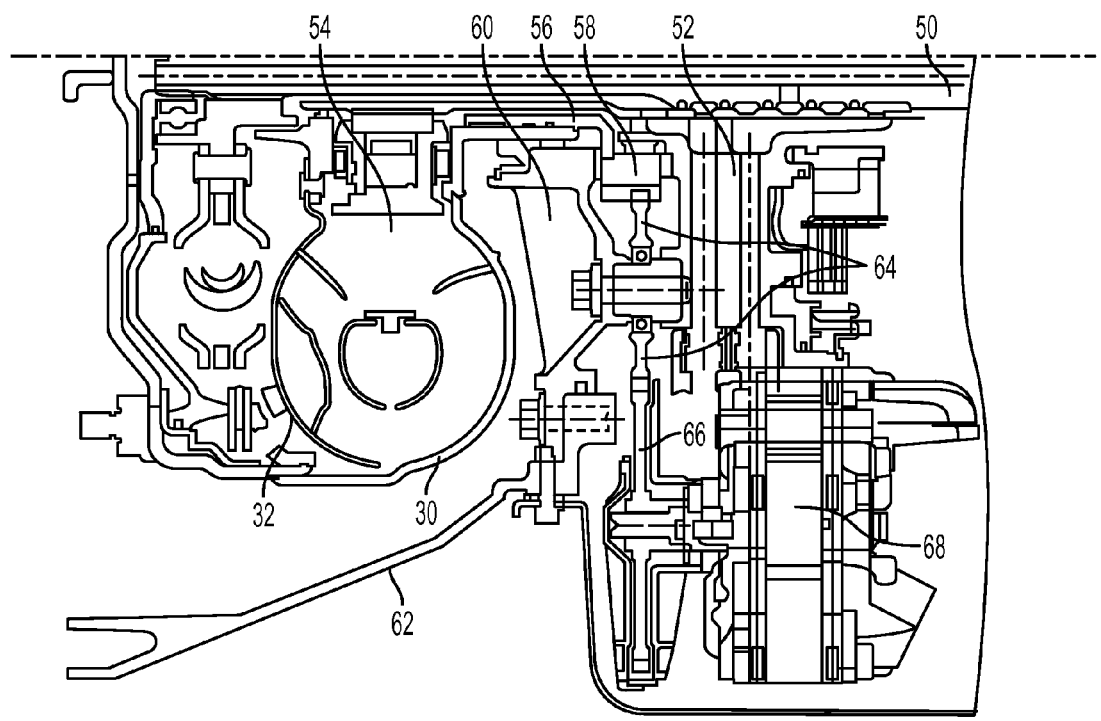
FIG. 3 is a cross section of the transmission of FIGS. 1 and 2 showing the transmission pump drive mechanism.
Figure 4:
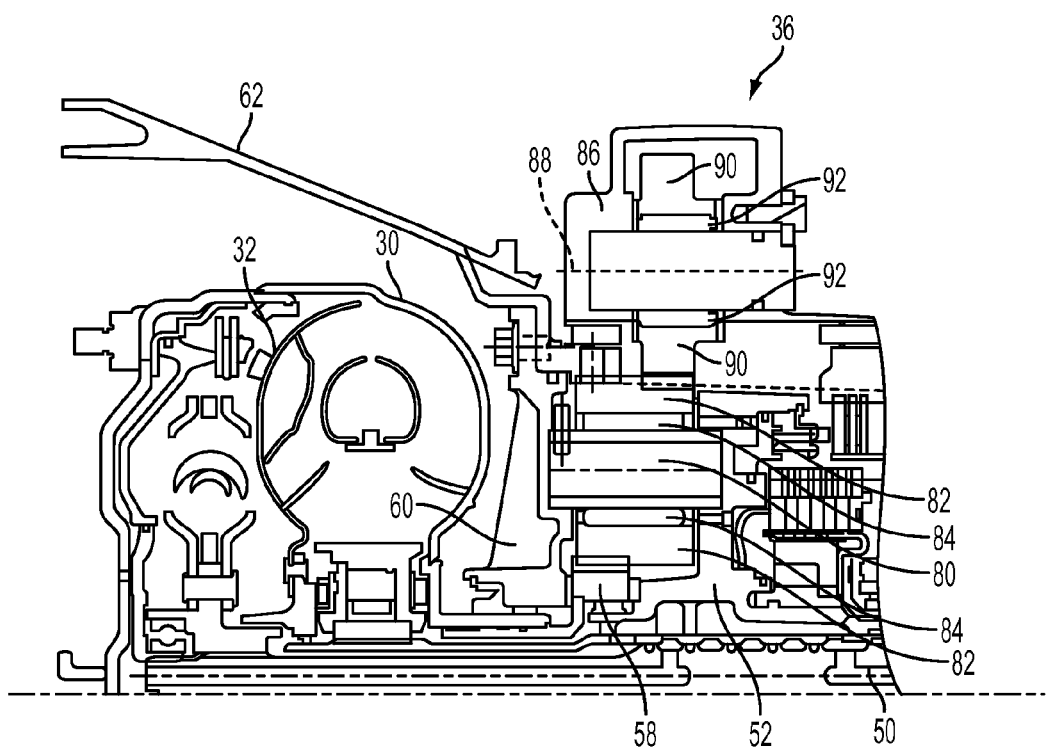
FIG. 4 is a cross section of a first embodiment of the transmission and one of the accessory drives of FIGS. 1 and 2 showing the accessory drive mechanism.

FIG. 2 is a cross sectional end view of transmission 14 with accessory drives 36 and 38 attached. Transmission housing 62 includes provisions for mounting the accessory drives in the proper locations. Specifically, accessory drive 36 is bolted to bosses 37 and accessory drive 38 is bolted to bosses 39. When either accessory drive is not installed, a cover may be bolted to the respective bosses. FIG. 3 is a cross section through section AA of FIG. 2 showing the gears driving transmission pump 28. FIG. 4 is a cross section through section BB of FIG. 2 showing the gears driving accessory drive 36. The gears driving accessory drive 38 are similar to those driving accessory drive 36.

FIG. 3 is a cross section of a portion of the transmission showing the transmission pump drive. Many parts are axisymmetric with respect to the centerline at the top of FIG. 2. Engine 12 (not shown) is located to the left and drives impeller 30. Turbine shaft 50 is fixed to turbine 32 and extends to the right to drive gearbox 26 (not shown). A stationary front support assembly is assembled separately and bolted to transmission case 62. The front support assembly includes a rear half 52 with a number of fluid passageways that transport fluid from the valve body to the turbine shaft. The rear half 52 of the front support assembly extends to the left to support the torque converter stator 54. The front support assembly also includes a front half 60 that bolts to transmission case 62 and also to the rear half 52. Impeller shaft 56 is a hollow shaft that extends between the front half 60 and the rear half 52 of the front support assembly to connect impeller 30 to primary drive gear 58. The front support assembly also includes transmission pump drive idler gear 64 which is supported between the front half 60 and rear half 52 and meshes with primary drive gear 58. Transmission pump drive main gear 66 meshes with transmission pump drive idler gear 64 and drives off-axis transmission pump 68. Off-axis transmission pumps are typically more efficient than on-axis transmission pumps because the packaging space available off-axis imposes fewer constraints on transmission pump design optimization. The improved transmission pump efficiency more than offsets the small power loss resulting from the transmission pump drive gear meshes.

FIG. 4 is a cross section of a portion of the transmission showing an accessory drive installed. The accessories, like transmission pump 28, are driven by the impeller shaft 56 via primary drive gear 58. The first idler shaft 80 is supported in the front support assembly between front half 60 and rear half 52. The first accessory drive idler gear 82 rotates about idler shaft 80 on a set of needle bearings 84 and meshes with the primary drive gear 58. Needle bearing 84 may be a caged needle bearing or a full complement needle bearing. In the embodiment illustrated in FIG. 4, first accessory drive idler gear 82 is installed into the front support assembly before the front support assembly is installed in the transmission. Thus, first accessory drive idler gear 82 is present even when the accessory drive 36 is not installed. Accessory drive housing 86 is bolted to transmission case 62. When accessory drive 36 is not installed, a cover may be bolted to transmission case 62 in its place. The second accessory drive idler shaft 88 is supported by accessory drive housing 86. The second accessory drive idler gear 90 rotates about idler shaft 88 on a set of needle bearings 92 and meshes with the first accessory drive idler gear 82. In the illustrated embodiment, the accessory load is driven by gear 94 which meshes with second accessory drive idler gear 90. In other embodiments, the accessory load may be driven by a gear that meshes directly with the first accessory drive idler gear or additional gear stages may be present. The second accessory drive is structured similarly but is bolted to the opposite side of the transmission.

Figure 5:
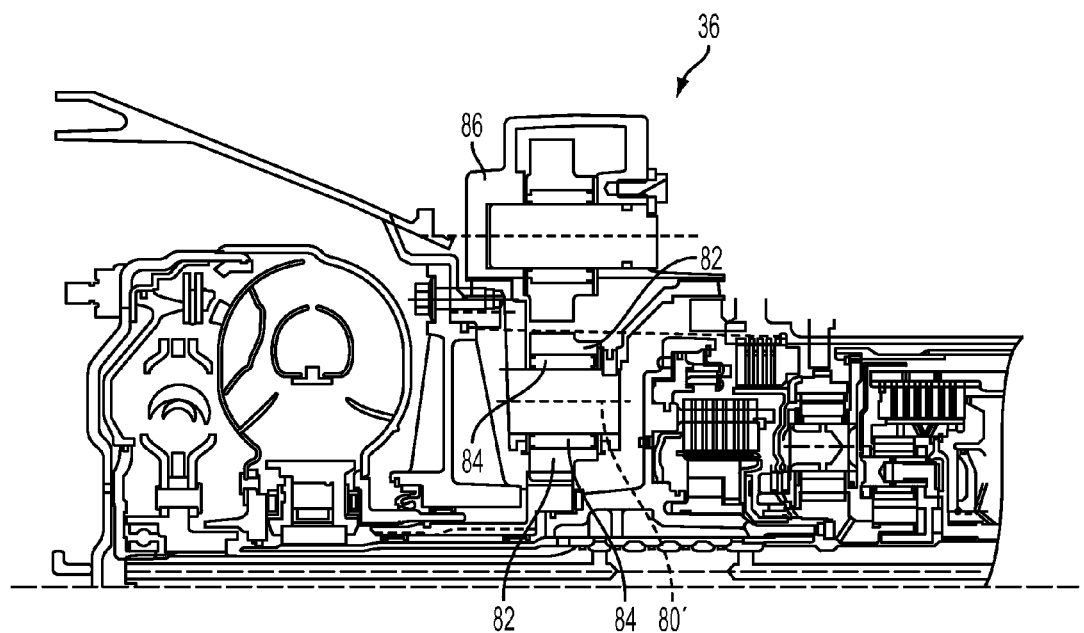
FIG. 5 is a cross section of a second embodiment of the transmission and one of the accessory drives of FIGS. 1 and 2 showing the accessory drive mechanism.

FIG. 5 is a cross section showing an alternative accessory drive installation. In the embodiment illustrated in FIG. 5, first accessory idler shaft 80' is supported by accessory housing 86 rather than the front support assembly. In the embodiment of FIG. 5, idler shaft 80', first accessory drive idler gear 82, and needle bearings 84 are not present until an accessory drive is installed.

In the accessory drive installations of FIGS. 4 and 5, power for the accessories is provided via the impeller. Therefore, power is available any time the engine is running. Power is available regardless of whether the gearbox is in neutral, park, reverse, or a forward gear. Power is available both when the vehicle is stationary and when the vehicle is moving.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   an input shaft;
   a primary drive gear fixed to the input shaft and having a first set of gear teeth;
   a first transmission pump drive gear with a second set of gear teeth in meshing engagement with the first set of gear teeth, the first transmission pump drive gear configured to transmit power from the input shaft to a transmission pump;
   a transmission case having provisions to support a first accessory drive unit, the first accessory drive unit having a first accessory drive gear with a third set of gear teeth, the provisions configured to support the first accessory drive unit such that the third set of gear teeth are in meshing engagement with the first set of gear teeth;
   a transmission pump shaft coupled to the transmission pump; and
   a second transmission pump gear fixed to the transmission pump shaft and having a fourth set of gear teeth in continuous meshing engagement with the second set of gear teeth.

2. The transmission of claim 1 wherein the transmission case has further provisions to support a second accessory drive unit, the second accessory drive unit having a second accessory drive gear with a fourth set of gear teeth, the provisions configured to support the second accessory drive unit such that the fourth set of gear teeth are in meshing engagement with the first set of gear teeth.

3. The transmission of claim 1 further comprising a torque converter having a turbine and having an impeller fixed to the input shaft.

4. A transmission comprising:
   an input shaft;
   a primary drive gear fixed to the input shaft and having a first set of gear teeth;
   a transmission pump drive gear having a second set of gear teeth in meshing engagement with the first set of gear teeth, the transmission pump drive gear configured to transmit power from the input shaft to a transmission pump;
   a first idler gear having a third set of gear teeth in meshing engagement with the first set of gear teeth and
   a second idler gear having a fourth set of gear teeth in meshing engagement with the first set of gear teeth.

5. The transmission of claim 4 further comprising a torque converter having a turbine and having an impeller fixed to the input shaft.

6. The transmission of claim 4 further comprising:
   a transmission case; and
   a front support fixed to the transmission case and supporting the transmission pump drive gear and the first idler gear.

7. The transmission of claim 4 further comprising:
   a transmission case;
   a front support fixed to the transmission case and supporting the transmission pump drive gear; and
   a first accessory drive unit fixed to the transmission case.

8. The transmission of claim 7 wherein the first idler gear is supported by the first accessory drive unit.

9. A transmission comprising:
   a primary drive gear fixed to an input shaft;
   first, second, and third idler gears in meshing engagement with the primary drive gear;
   a transmission pump driven by a pump shaft;
   a pump gear fixed to the pump shaft and in meshing engagement with the first idler gear; and
   a transmission housing adapted to support a first accessory such that a gear of the first accessory meshes with the second idler gear.

10. The transmission of claim 9:
    wherein the transmission housing is further adapted to support a second accessory such that a gear of the second accessory meshes with the third idler gear.

11. The transmission of claim 9 further comprising:
    a front support fixed to a transmission case and supporting the first, second, and third idler gears.

12. The transmission of claim 9 further comprising a torque converter having a turbine and having an impeller fixed to the input shaft.

13. The transmission of claim 12 further comprising:
    a gear box having a plurality of hydraulically actuated shift elements configured to establish various speed ratios in response to fluid pressure supplied by the transmission pump.

* * * * *